(12) United States Patent
Kim et al.

(10) Patent No.: US 8,284,335 B2
(45) Date of Patent: Oct. 9, 2012

(54) ELECTRONIC DISPLAY DEVICE

(75) Inventors: Beom-Shik Kim, Suwon-si (KR); Ja-Seung Ku, Suwon-si (KR); Hui Nam, Suwon-si (KR); Chan-Young Park, Suwon-si (KR); Hyoung-Wook Jang, Suwon-si (KR)

(73) Assignee: Samsung Display Co., Ltd., Suwon-si, Gyeonggi-do (KR)

( * ) Notice: Subject to any disclaimer, the term of this patent is extended or adjusted under 35 U.S.C. 154(b) by 805 days.

(21) Appl. No.: 12/382,043

(22) Filed: Mar. 6, 2009

(65) Prior Publication Data
US 2009/0225243 A1 Sep. 10, 2009

(30) Foreign Application Priority Data
Mar. 7, 2008 (KR) .................. 10-2008-0021484

(51) Int. Cl.
*G02F 1/1335* (2006.01)
(52) U.S. Cl. .............. 349/15; 349/187; 349/158; 349/6; 345/6; 345/87; 345/205; 345/94
(58) Field of Classification Search .................. 349/15, 349/187, 158, 6; 345/6, 87, 205, 94
See application file for complete search history.

(56) References Cited

U.S. PATENT DOCUMENTS

| 7,404,642 B2 | 7/2008 | Shestak et al. | |
| 7,619,815 B2* | 11/2009 | Nam et al. | 359/464 |
| 2002/0145699 A1* | 10/2002 | Moore | 349/187 |
| 2006/0038955 A1* | 2/2006 | Kim et al. | 349/158 |
| 2006/0146208 A1* | 7/2006 | Kim | 349/15 |
| 2007/0019291 A1* | 1/2007 | Nam et al. | 359/464 |
| 2007/0046564 A1* | 3/2007 | Kim et al. | 345/6 |

FOREIGN PATENT DOCUMENTS

| KR | 10-2006-0059775 A | 6/2006 |
| KR | 10-2006-0078165 A | 7/2006 |
| KR | 10-2006-0124849 A | 12/2006 |

\* cited by examiner

*Primary Examiner* — Edward Glick
*Assistant Examiner* — Sang Nguyen
(74) *Attorney, Agent, or Firm* — Lee & Morse, P.C.

(57) ABSTRACT

An electronic display device includes a display unit adapted to display an image, and a barrier unit overlapping the display unit, the barrier unit including a liquid crystal layer between first and second substrates, the first and second substrates facing each other, a common electrode between the liquid crystal layer and the first substrate, a transparent insulation layer between the liquid crystal layer and the second substrate, the transparent insulation layer having an inner surface facing the liquid crystal layer and an outer surface facing the second substrate, a plurality of first electrodes along a first direction between the outer surface of the transparent insulation layer and the second substrate, the first electrodes being spaced apart from each other along a second direction, and a plurality of second electrodes along the first direction between the inner surface of the transparent insulation layer and the first substrate.

16 Claims, 14 Drawing Sheets

ELECTRONIC DISPLAY DEVICE

BACKGROUND OF THE INVENTION

1. Field of the Invention

Example embodiments relate to an electronic display device. More particularly, example embodiments relate to an electronic display device capable of displaying a three-dimensional image.

2. Description of the Related Art

An electronic display device capable of conveying a three-dimensional (3D) image to a viewer may include, e.g., a stereoscopic display device, an autostereoscopic display device, and so forth. A stereoscopic display device refers to a display device providing different images, e.g., different 2D images, to each of the left and right eyes of the viewer to allow the viewer to feel a stereoscopic effect, e.g., view a 3D image. An autostereoscopic display device refers to a display device with a binocular parallax capable of conveying a 3D image to the viewer without using special equipment, e.g., without using polarizing glasses by the viewer.

A stereoscopic display device may include a barrier unit with a liquid crystal layer and electrodes between two substrates. However, the electrodes of the conventional stereoscopic device may include gaps therebetween, e.g., along a horizontal direction of a screen, to prevent a short circuit between the electrodes. Light emitted toward the liquid crystal layer may leak through the gaps between the electrodes, thereby increasing crosstalk and reducing display properties of the stereoscopic display device, e.g., reducing image quality of a displayed stereoscopic image, deteriorating a contrast of the screen, and so forth.

The above information disclosed in this Background section is only for enhancement of understanding of the background of the invention, and therefore, it may contain information that does not form the prior art that is already known in this country to a person of ordinary skill in the art.

SUMMARY OF THE INVENTION

Example embodiments are therefore directed to an electronic display device capable of displaying a stereoscopic image, which substantially overcomes one or more of the disadvantages of the related art.

It is therefore a feature of an example embodiment to provide an electronic display device having an electrode structure capable of minimizing light leakage through a barrier unit thereof to enhance display properties of stereoscopic images.

At least one of the above and other features and advantages may be realized by providing an electronic display device, including a display unit adapted to display an image, and a barrier unit overlapping the display unit, the barrier unit including a liquid crystal layer between first and second substrates, the first and second substrates facing each other, a common electrode between the liquid crystal layer and the first substrate, a transparent insulation layer between the liquid crystal layer and the second substrate, the transparent insulation layer having an inner surface facing the liquid crystal layer and an outer surface facing the second substrate, a plurality of first electrodes along a first direction between the outer surface of the transparent insulation layer and the second substrate, the first electrodes being spaced apart from each other along a second direction, and a plurality of second electrodes along the first direction between the inner surface of the transparent insulation layer and the first substrate.

The barrier unit may further include a plurality of black layers along the first direction on lateral surfaces of the second electrodes, lateral surfaces of the second electrodes being perpendicular to a contact plane between the transparent insulation layer and the second electrodes, and the black layers overlapping portions of the first electrodes. Two black layers of the plurality of black layers may be positioned along two respective lateral surfaces of each second electrode. Black layers on facing lateral surfaces of adjacent second electrodes may be spaced apart from each other to define a gap therebetween. A first electrode may overlap two black layers of two corresponding adjacent second electrodes, the two black layers facing each other and being spaced apart from each other. The first and second electrodes may be arranged in an alternating pattern. A lateral surface of a first electrode may be in a substantially same plane as a lateral surface of an immediately adjacent second electrode. A width of the first electrodes may be greater than a width of the second electrodes, the width of the first and second electrodes being measured along the second direction. A width of a single first electrode may substantially equal a sum of a width of a single second electrode and widths of two black layers, the widths of the first and second electrodes and the black layers being measured along the second direction. A width of a single first electrode may be greater than a gap between two adjacent black layers facing each other, the two black layers corresponding to respective two adjacent second electrodes.

The barrier unit may further include a first polarizing plate on an outer surface of the first substrate and a second polarizing plate on an outer surface of the second substrate, outer surfaces of the first and second substrates facing away from the liquid crystal layer, a polarizing axis of the first polarizing plate being substantially perpendicular to a polarizing axis of the second polarizing plate. The electronic display device may be adapted to apply no voltage to the common electrode and the first and second electrodes of the barrier unit to display a 2-dimensional (2D) image. The electronic display device may be adapted to apply predetermined voltage signals to the common electrode and the first and second electrodes of the barrier unit to display a 3-dimensional (3D) image. The predetermined voltage signals may include a common voltage signal adapted to be applied to the common electrode during a first time period of a frame and during a second time period of the frame, and a liquid crystal driving voltage signal adapted to be applied to the first electrodes during the first time period and to the second electrodes during the second time period, the first and second time periods defining the frame.

The barrier unit may further include a first polarizing plate on an outer surface of the first substrate and a second polarizing plate on an outer surface of the second substrate, outer surfaces of the first and second substrates facing away from the liquid crystal layer, a polarizing axis of the first polarizing plate being substantially parallel to a polarizing axis of the second polarizing plate. The electronic display device may be adapted to apply a common voltage to the common electrode and a liquid crystal driving voltage to the first and second electrodes of the barrier unit to display a 2-dimensional (2D) image. The electronic display device may be adapted to apply predetermined voltage signals to the common electrode and the first and second electrodes of the barrier unit to display a 3-dimensional (3D) image.

At least one of the above and other features and advantages may be realized by providing a barrier unit for an electronic display device, including a liquid crystal layer between first and second substrates, the first and second substrates facing each other, a common electrode between the liquid crystal layer and the first substrate, a transparent insulation layer between the liquid crystal layer and the second substrate, the transparent insulation layer having an inner surface facing the liquid crystal layer and an outer surface facing the second substrate, a plurality of first electrodes along a first direction between the outer surface of the transparent insulation layer and the second substrate, the first electrodes being spaced apart from each other along a second direction, and a plurality of second electrodes along the first direction between the inner surface of the transparent insulation layer and the first substrate. The barrier unit may further include a plurality of black layers along the first direction on lateral surfaces of the second electrodes, lateral surfaces of the second electrodes being perpendicular to a contact plane between the transparent insulation layer and the second electrodes, and the black layers overlapping portions of the first electrodes.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION OF THE INVENTION

Figure 1:
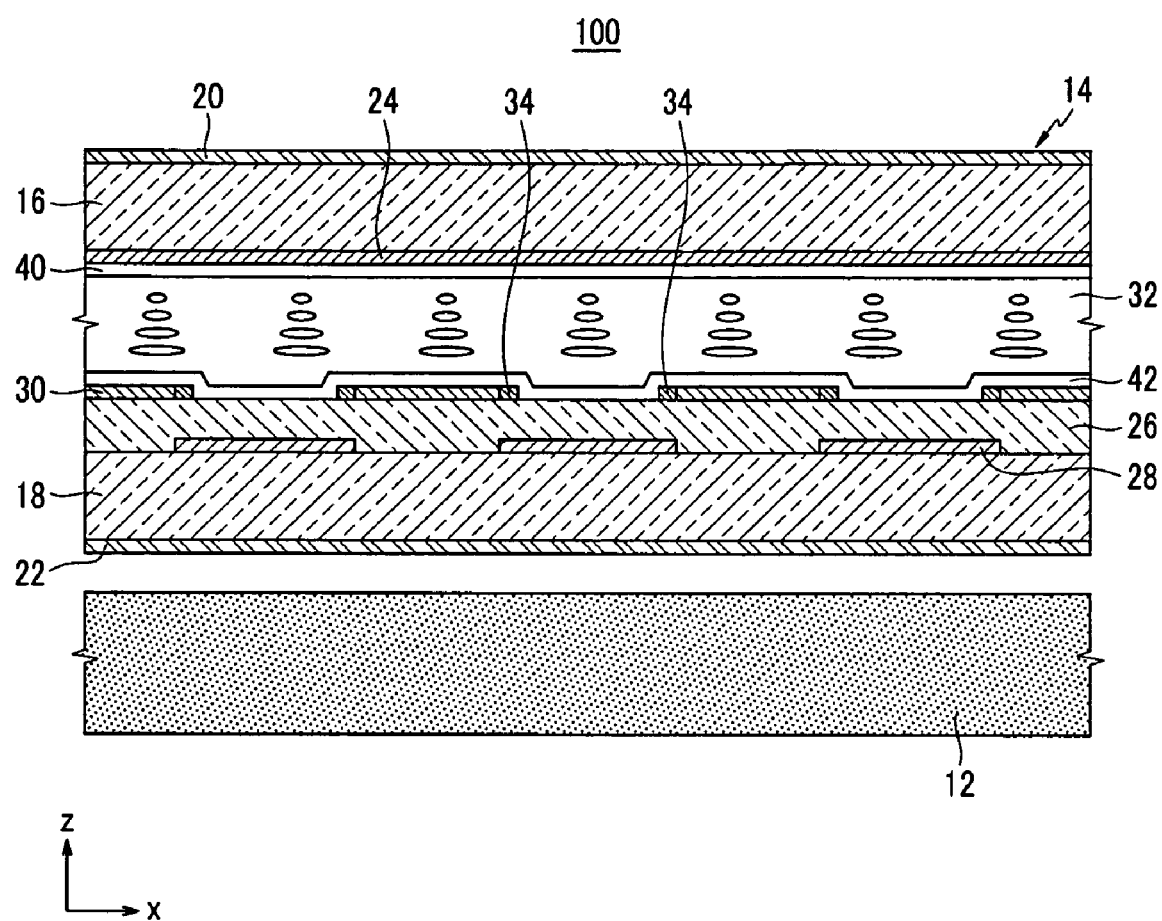
FIG. 1 illustrates a partial cross-sectional view of an electronic display device according to an example embodiment.

Korean Patent Application No. 10-2008-0021484, filed on Mar. 7, 2008, in the Korean Intellectual Property Office, and entitled: "Electronic Display Device," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

As used herein, the terms "a" and "an" are open terms that may be used in conjunction with singular items or with plural items.

FIG. 1 illustrates a partial cross-sectional view of an electronic display device according to an example embodiment. Referring to FIG. 1, an electronic display device 100 may include a display unit 12 displaying an image and a barrier unit 14 disposed in front of the display unit 12, e.g., overlapping the display unit 12.

The display unit 12 of the electronic display device 100 may include a plurality of pixels, e.g., each pixel of the plurality of pixels may include red, green, and blue sub-pixels. The plurality of pixels may include left-eye pixels and right-eye pixels for respective left-eye and right-eye images. For example, the display unit 12 may display a two-dimensional (2D) image, e.g., by a two-dimensional (2D) image signal applied to each pixel of the plurality of pixels. In another example, the display unit 12 may separately display left-eye and right-eye images, e.g., by applying left-eye and right-eye image signals to predetermined pixel units and/or sub-pixel units. The image signals may be controlled by an image signal control unit (not shown). The display unit 12 may be any suitable display, e.g., a liquid crystal display (LCD), an organic light emitting diode (OLED) display, a plasma display panel (PDP), a cathode ray tube (CRT), a field emission display (FED), and so forth.

Figure 2:
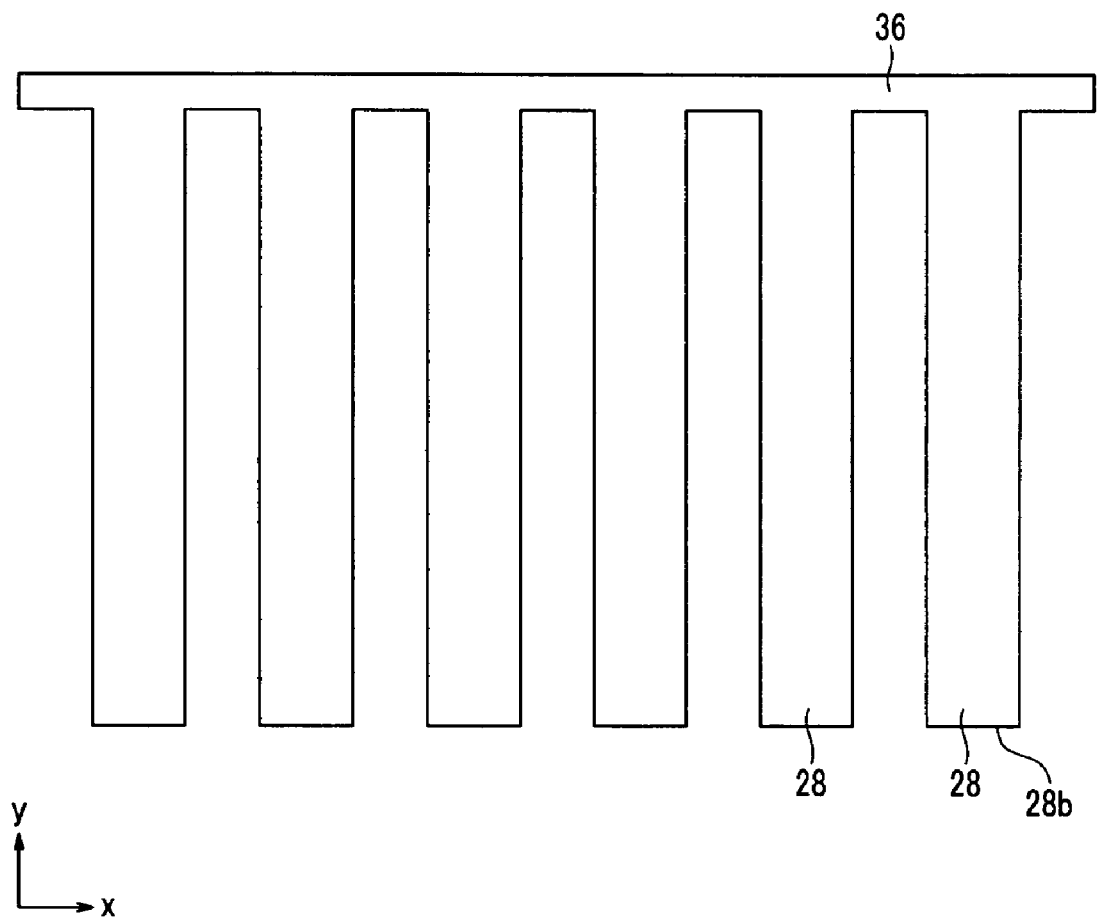
FIG. 2 illustrates a top plan view of first electrodes of a barrier unit in the electronic display device of FIG. 1.
Figure 3:
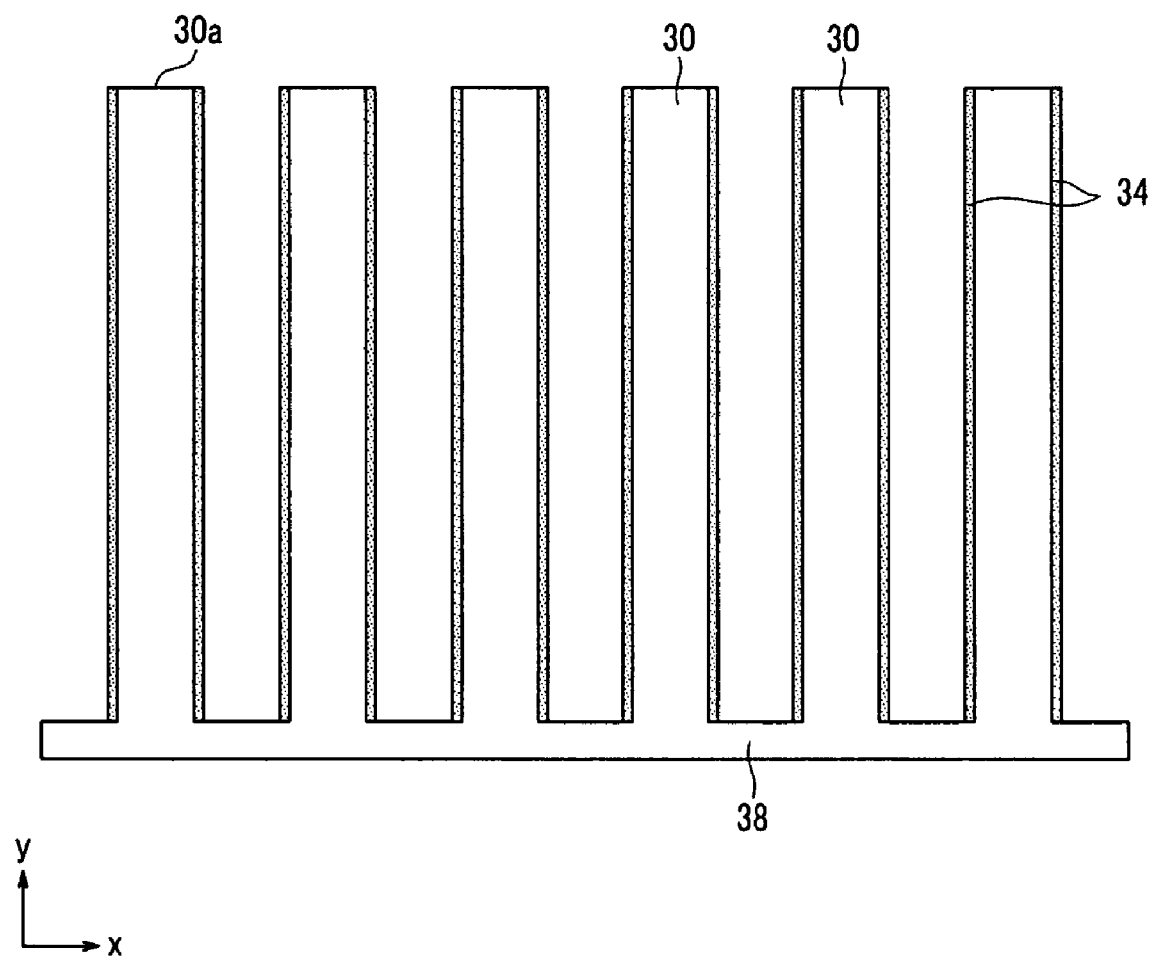
FIG. 3 illustrates a top plan view of second electrodes of a barrier unit in the electronic display device of FIG. 1.
Figure 4:
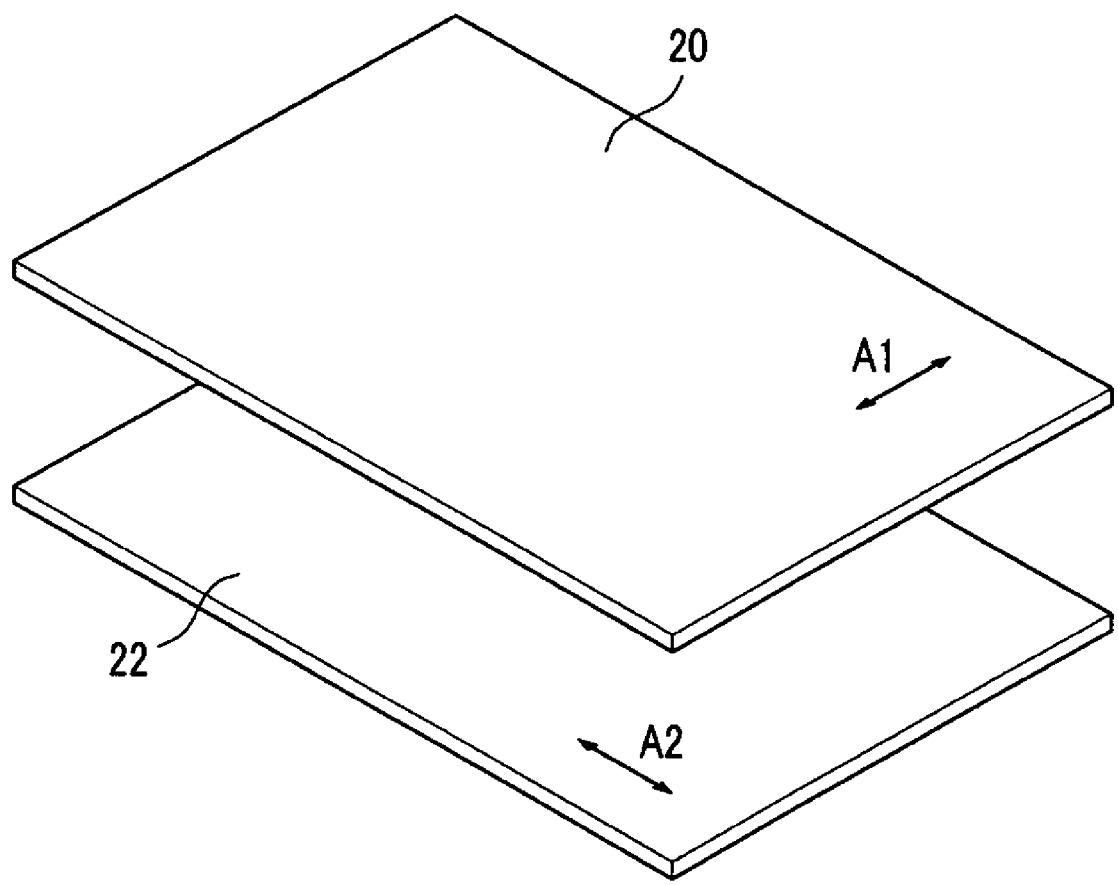
FIG. 4 illustrates a perspective schematic view of first and second polarizing plates of a barrier unit in the electronic display device of FIG. 1.

The barrier unit 14 of the electronic display device 100 may facilitate image display by controlling light transmission therethrough. For example, the barrier unit 14 may optically define light interception and transmission regions therein to respectively separate the left-eye and right-eye images into left-eye and right-eye directions. The structure of the barrier unit 14 will be described in more detail with reference to FIGS. 1-4. FIGS. 2-3 illustrate top plan views of first and second electrodes of the barrier unit 14, respectively, and FIG. 4 illustrates a perspective schematic view of first and second polarizing plates of the barrier unit 14.

Referring to FIGS. 1-3, the barrier unit 14 may include a first substrate 16, a second substrate 18 facing the first substrate 16 at a predetermined interval, a first polarizing plate 20 disposed on an outer surface of the first substrate 16, a second polarizing plate 22 disposed on an outer surface of the second substrate 18, a common electrode 24 formed on an inner surface of the first substrate 16, first electrodes 28 formed on an inner surface of the second substrate 18, a transparent insulation layer 26 formed on the inner surface of the second substrate 18 while covering the first electrodes 28, second electrodes 30 formed on the transparent insulation layer 26, and a liquid crystal layer 32 between the first and second substrates 16 and 18. It is noted that "inner surfaces" of the first and second substrates 16 and 18 refer to surfaces facing the liquid crystal layer 32, and "outer surfaces" of the first and second substrates 16 and 18 refer to surfaces facing away from the liquid crystal layer 32.

The first and second substrates 16 and 18 of the barrier unit 14 may be transparent. For example, each one of the first and second substrates 16 and 18 may be formed of a transparent glass and/or a transparent synthetic resin.

The first and second polarizing plates 20 and 22 of the barrier unit 14 may be linear polarizing plates. For example, as illustrated in FIG. 4, the first and second polarizing plates 20 and 22 may be disposed, such that a polarizing axis A1 of the first polarizing plate 20 may be substantially perpendicular to a polarizing axis A2 of the second polarizing plate 22.

The common electrode 24 of the barrier unit 14 may be formed on an entire inner surface of the first substrate 16, e.g., the common electrode 24 may be formed directly on the entire inner surface of the first substrate 16. The common electrode 24 may be formed of a transparent conductive material, e.g., indium tin oxide (ITO) and/or indium zinc oxide (IZO).

The first electrodes 28 of the barrier unit 14 may be formed in a stripe pattern on the inner surface of the second substrate 18, e.g., directly on the inner surface of the second substrate 18. For example, as illustrated in FIG. 2, the first electrodes 28 may extend along a first direction, e.g., along the y-axis, and may be spaced apart from each other along a second direction, e.g., along the x-axis. For example, the first direction may be referred to as a vertical direction of a screen, and the second direction may be referred to as a horizontal direction of the screen. The first electrodes 28 may be formed of a transparent material, e.g., the first electrodes 28 may be formed of the substantially same material as the common electrode 24.

As further illustrated in FIG. 2, first edges of the first electrodes 28, i.e., horizontal edges along the x-axis, may be electrically connected to each other by a first connector 36 extending in the second direction, e.g., along the x-axis. For example, the first connector 36 may have a linear structure extending in a peripheral region of the barrier unit 14 along the second direction, so the first edges of the first electrodes 28 may be connected to each other. For example, second edges 28*b* of the first electrodes 28 may be opposite respective first edges, so the first electrodes 28 with the first connector 3*y* may have a rotated ∃-structure, e.g., ∃-structure rotated by 90°.

The transparent insulation layer 26 of the barrier unit 14 may be formed on an entire inner surface of the second substrate 18 to cover the first electrodes 28, e.g., the first electrodes 28 may be between the second substrate 18 and the transparent insulation layer 26. For example, as illustrated in FIG. 1, a portion of the transparent insulation layer 26, e.g., a portion of the transparent layer 26 between adjacent first electrodes 28, may be in direct contact with the second substrate 18.

The second electrodes 30 of the barrier unit 14 may be formed in a stripe pattern on the transparent insulation layer 26, e.g., directly on the transparent insulation layer 26. The transparent insulation layer 26 may be between the first and second electrodes 28 and 30, so the first and second electrodes 28 and 30 may be on opposite surfaces of the transparent insulation layer 26, as will be discussed in more detail below. As illustrated in FIG. 3, the second electrodes 30 may extend along a first direction, e.g., along the y-axis, and may be spaced apart from each other along a second direction, e.g., along the x-axis. The second electrodes 30 may be formed of a transparent material, e.g., the second electrodes 30 may be formed of the substantially same material as the common electrode 24. For example, the second electrodes 30 may be positioned closer, e.g., along the z-axis, to the liquid crystal layer 32 than the first electrodes 28.

The first and second electrodes 28 and 30 may be arranged in an alternating pattern. In other words, the second electrodes 30 may be formed to overlap spaces between adjacent first electrodes 28, so each second electrode 30 may be between two adjacent first electrodes 28 along the x-axis. For example, the second electrodes 30 may be positioned on portions of the transparent insulation layer 36 between two adjacent first electrodes 28, so a second electrode 30 may be between two first adjacent first electrodes 28, e.g., as viewed from a top view in the xy-plane. It is noted that even though the first and second electrodes 28 and 30 may be on different vertical layers, i.e., positioned at a different distance as measured along the z-axis from the inner surface of the second substrate 18 toward the first substrate 16, a second electrode 30 may be between two adjacent first electrodes 28 as viewed along the x-axis. As illustrated in FIG. 1, for example, the first and second electrodes 28 and 30 may be positioned so a side surface, i.e., a surface in the zy-plane, of a first electrode 28 may be in a substantially same plane as a side surface of an immediately adjacent second electrode 30. It is noted, however, that the first and second electrodes 28 and 30 may not overlap each other in the z-axis.

As further illustrated in FIG. 3, the barrier unit 14 may further include black layers 34 along lateral surfaces of the second electrodes 30, i.e., edges of the second electrodes 30 along the y-axis. For example, a black layer 34 may be formed on each of left and right side surfaces, i.e., lateral surfaces in the zy-plane, of each of the second electrodes 30, e.g., each black layer 34 may be in direct contact with an entire side surface of a respective second electrode 30 along the y-axis. Each black layer 34 may overlap a portion of a respective first electrode 28 along the z-axis, as illustrated in FIG. 1, so the black layers 34 may intercept and absorb light emitted from the display unit 12. It is noted, however, that since a width of each of the black layers 34, i.e., a distance as measured along the x-axis, may be substantially small, e.g., several micrometers, effects of the black layers 34 on luminance, e.g., reduced luminance, are insignificant. As illustrated in FIG. 1, thickness of the black layers 34 along the z-axis may substantially equal thickness of the second electrodes 30. In another example, as illustrated in FIG. 3, length of the black layers 34 along the y-axis may substantially equal length of the second electrodes 30.

As further illustrated in FIG. 3, second edges of the second electrodes 30 may be electrically connected to each other by a second connector 38 extending in the second direction, e.g., along the x-axis. The second connector 38 may have a linear structure extending in a peripheral region of the barrier unit 14 along the second direction, so the second edges of the second electrodes 30 may be connected to each other. For example, first edges 30*a* of the second electrodes 30 may be opposite the second edges of the second connector 38, so the second electrodes 30 with the second connector 38 may have a rotated ∃-structure, e.g., rotated by 90°. The second connector 38 may be spaced apart from the first connector 36 along the y-axis. For example, the first edges of the first electrodes 28 may be substantially above the first edges 30*a* of the second electrodes 30, and the second edges 28*b* of the first electrodes 28 may be substantially above the second edges of the second electrodes 30, so the first and second connectors 36 and 38 may be spaced apart from each other along the y-axis.

The barrier unit 14 may further include first and second orientation layers 40 and 42. The first orientation layer 40 may be formed on the common electrode 24 to face the liquid crystal layer 32, e.g., the first orientation layer 40 may be substantially planar. The second orientation layer 42 may be formed conformally on an entire surface of the transparent insulation layer 26 to cover the second electrodes 30 and the black layers 34, i.e., to face the liquid crystal layer 32.

The first and second orientation layers 40 and 42 may align liquid crystal molecules of the liquid crystal layer 32 in a specific direction. For example, the liquid crystal layer 32 may be formed between the first and second orientation layers 40 and 42. The liquid crystal layer 32 may include, e.g., twisted nematic (TN) liquid crystal. The TN liquid crystal may have a twisting angle of about 90° when no voltage is applied thereto.

The barrier unit 14 described with reference to FIGS. 1-4 may control light transmission therethrough to define light interception and transmission regions for left and right eye images by adjusting a voltage applied to the common electrode 24, the first electrodes 28, and the second electrodes 30. For example, no voltage may be applied to the common electrode 24, first electrodes 28, and second electrodes 30 of the barrier unit 14, so that the barrier unit 14 may realize 2D images. In another example, predetermined voltage signals may be applied to the electrodes of the barrier unit 14 to form separate left-eye and right-eye images, so that the barrier unit 14 may realize 3D images.

For example, in order to display a 2D image via the display unit 12, 2D image signals may be applied to all the pixels of the display unit 12, so the display unit 12 may display a single 2D image. Further, no voltage may be applied to the common electrode 24, first electrodes 28, and second electrodes 30 of the barrier unit 14. In other words, since the liquid crystal layer 32 of the barrier unit 14 includes TN liquid crystal, and the polarizing axes A1 and A2 of the first and second polarizing plates 20 and 22 are perpendicular to each other, light that is polarized in a direction A2 by the second polarizing plate 22 (see FIG. 4) may be twisted by about 90° while passing through the liquid crystal layer 32 to subsequently pass through the first polarizing plate 20. Therefore, when no voltage is applied to the electrodes of the barrier unit 14, substantially all light emitted from the display unit 12 toward the barrier unit 14 may be transmitted therethrough to realize the full transmission mode, i.e., a normally white mode. The barrier unit 14 with the normally white mode, i.e., displaying 2D images, may be effective in reducing power consumption, as compared to a mode displaying stereoscopic images.

In another example, in order to display a 3D image, i.e., a stereoscopic image, via the display unit 12, left-eye image signals and right-eye image signals may be separately applied to corresponding pixels, i.e., or respective sub-pixels, of the display unit 12, so the display unit 12 may realize separate displays of left-eye and right-eye images. Further, predetermined voltage signals, e.g., a liquid crystal driving voltage, may be applied to the first electrodes 28 or second electrodes 30 of the barrier unit 14 to optically form light interception and transmission regions in the barrier unit 14. A time-division driving method, i.e., a method for optically forming light interception and transmission regions in the barrier unit 14 for realizing a stereoscopic image, will be described in more detail below with reference to FIGS. 5-9.

Figure 5:
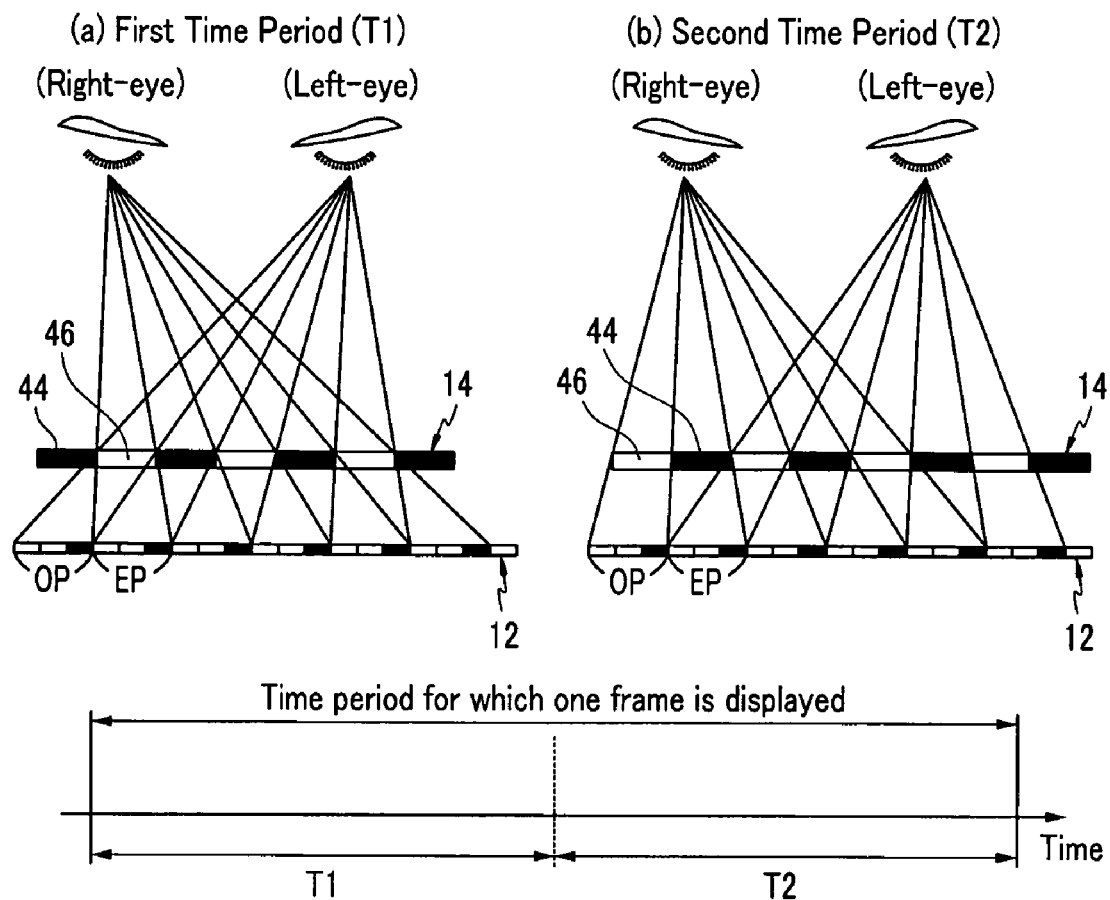
FIG. 5 illustrates a schematic diagram of a time-division driving method of an electronic display device according to an example embodiment.

FIG. 5 illustrates a schematic diagram of a time-division driving method of the electronic display device 100. In particular, part (a) of FIG. 5, i.e., left side of FIG. 5, illustrates a first time period T1, and part (b) of FIG. 5, i.e., right side of FIG. 5, illustrates a second time period T2. It is noted that a total time period for which one frame is displayed by the display unit 12 may be divided into the first and second time periods T1 and T2. In the first time period T1, an image may be synthesized along the horizontal direction in a first order, i.e., left-eye-right-eye-left-eye-right-eye, and in the second time period T2, an image may be synthesized along the horizontal direction in a second order, i.e., right-eye-left-eye-right-eye-left-eye. It is noted that pixels arranged in a horizontal direction of a screen of the display unit 12 may be classified into odd-numbered pixels OP and even-numbered pixels EP.

Referring to (a) in FIG. 5, in the first time period T1, the odd-numbered pixels (or odd-numbered sub-pixels) OP of the display unit 12 may function as left-eye pixels (or left-eye sub-pixels) and the even-numbered pixels (or even-numbered sub-pixels) EP may function as right-eye pixels (or right-eye sub-pixels). Accordingly, in the first time period T1, the odd-numbered pixels OP may display the left-eye image, and the even-numbered pixels EP may display the right-eye image. As illustrated in FIG. 5, light interception regions 44 and light transmission regions 46 may be alternately arranged in the barrier unit 14 along the horizontal direction of the screen with respect to displayed left-eye and right-eye images, e.g., transmission regions 46 may correspond to odd-numbered pixels OP displaying left-eye images and interception regions 44 may correspond to even-numbered pixels EP displaying right-eye images. Paths along which the left-eye image and the right-eye image are respectively directed to left and right eyes of the viewer may be formed.

Referring to (b) in FIG. 5, in the second time period T2, the odd-numbered pixels (or odd-numbered sub-pixels) OP of the display unit 12 may function as the right-eye pixels (or right-eye sub-pixels) and the even-numbered pixels (or even-numbered sub-pixels) EP may function as the left-eye pixels (or left-eye sub-pixels). Accordingly, in the second time period T2, the odd-number pixels OP may display the right-eye image, and the even-numbered pixels EP may display the left-eye image. As illustrated in FIG. 5, the light transmission regions 46 and the light interception regions 44 may be alternately arranged in the barrier unit 14 in the horizontal direction of the screen with respect to displayed left-eye and right-eye images, e.g., transmission regions 46 may correspond to odd-numbered pixels OP displaying right-eye images and interception regions 44 may correspond to even-numbered pixels EP displaying left-eye images. Paths along which the right-eye and left-eye images are respectively directed to the right and left eyes of the viewer may be formed.

Driving of the barrier unit 14 may be synchronized with the driving of the display unit 12. In particular, the light interception and transmission regions 44 and 46 for the first time period T1 may be respectively switched to the light transmission and interception regions 46 and 44 for the second time period T2 via voltage application to the electrodes of the barrier unit 14, as will be discussed in more detail below with reference to FIGS. 6-9, so separate left-eye and right-eye images may be displayed. Since the left-eye and right-eye images may be separated from each other by the barrier unit 14 to have a predetermined disparity therebetween, a viewer viewing the electronic display device 100 may feel a stereoscopic effect by obtaining a depth perception similar to an actual solid object. As the total time period for which one frame is displayed is divided into the first and second time periods T1 and T2, the viewer may see all the pixels of the display unit 12, i.e., the odd-numbered pixels OP and the even-numbered pixels EP, and thus, may see the stereoscopic image having the same resolution as the 2D image.

Figure 6:
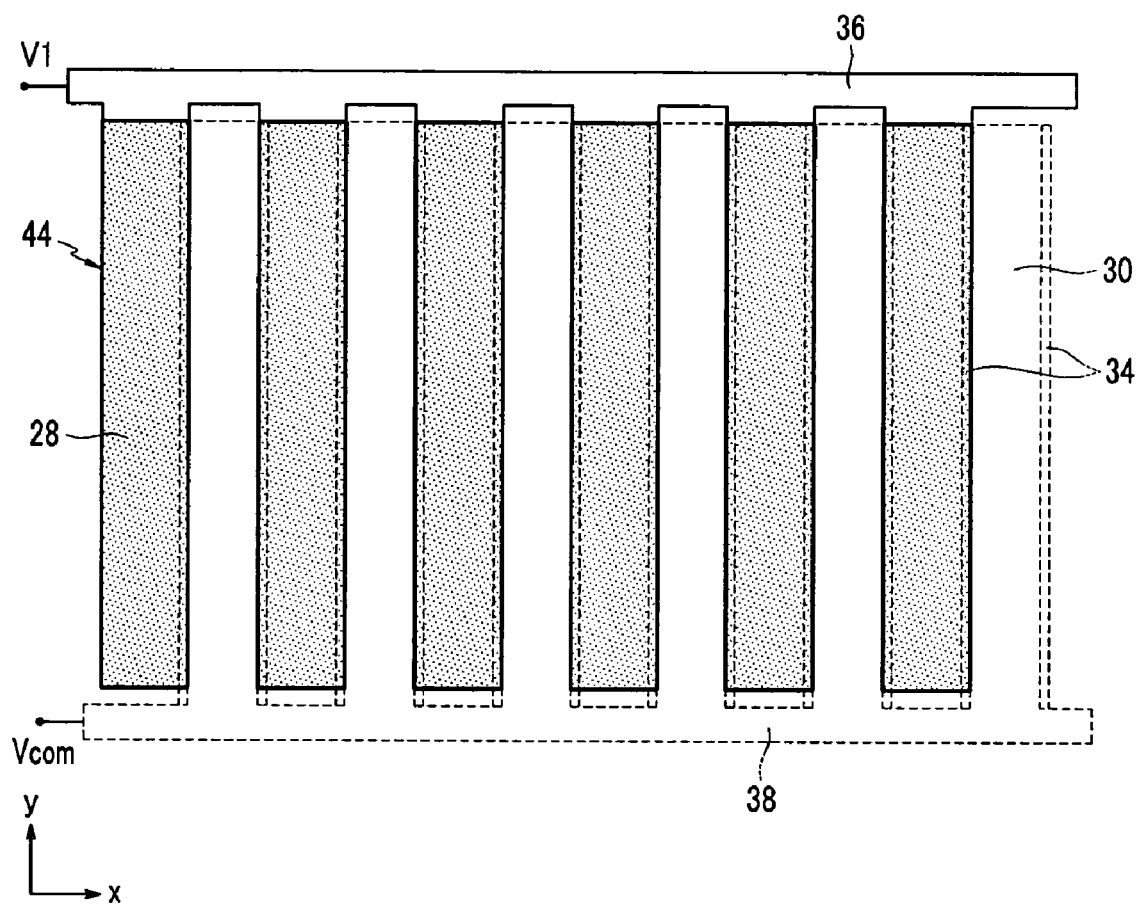
FIG. 6 illustrates a top plan view of the first and second electrodes of FIGS. 2-3 for a first time period in FIG. 5.
Figure 7:
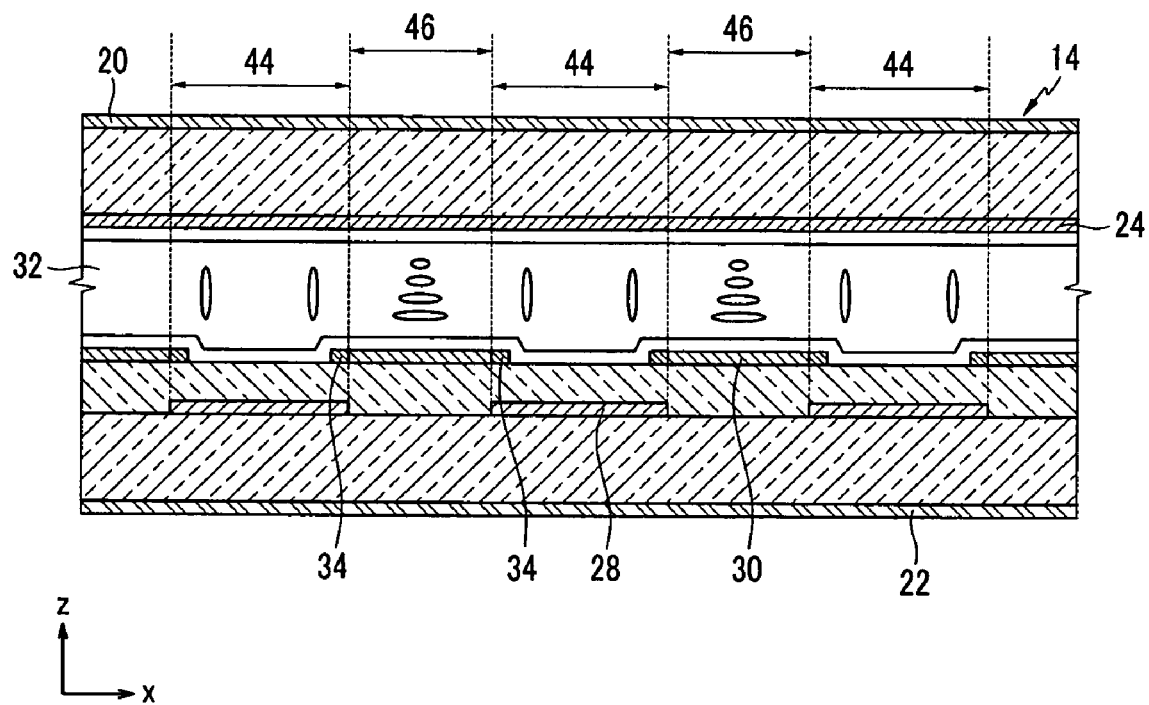
FIG. 7 illustrates a partial cross-sectional view of a barrier unit of FIG. 1 for a first time period in FIG. 5.

FIGS. 6-7 illustrate a principle for optically forming the light interception and transmission regions 44 and 46 in the barrier unit 14 for the first time period T1. Referring to FIGS. 6-7, a common voltage Vcom, e.g., about 0 V, may be applied to the common electrode 24, and a liquid crystal driving voltage V1, i.e., a voltage difference with respect to the common voltage required to activate a liquid crystal, may be applied to the first connector 36, i.e., to the first electrodes 28. A voltage difference between the common and first electrodes 24 and 28 may align the liquid crystal molecules in the liquid crystal layer 32 vertically along the z-axis in the barrier unit 14 at regions corresponding to the first electrodes 28. Therefore, light linearly polarized along the A2-axis by the second polarizing plate 22 (see FIG. 4) may maintain its polarization direction in regions corresponding to the first electrodes 28 when passing through the liquid crystal layer 32.

Since light polarized along the A2-axis may maintain its polarization in regions corresponding to the first electrodes 28, light in regions corresponding to the first electrodes 28 may not pass through the first polarizing plate 20, i.e., only light corresponding to second electrodes 30 may be directed through non-vertically aligned liquid crystal molecules to pass through the second polarizing plate 20. As a result, in the barrier unit 14, regions corresponding to the first electrodes 28 may optically function as the light interception regions 44 and the remaining regions, i.e., regions between adjacent first electrodes 28, may function as the light transmission regions 46. In other words, only light in regions corresponding to the second electrodes 30, i.e., regions between adjacent first electrodes 28, may pass through the first polarizing plate 20 to define the light transmission regions 46. At this point, the second electrodes 30 may be applied with the common voltage Vcom or may be floated.

It is noted that as the first and second electrodes 28 and 30 are alternately arranged in the horizontal direction (the x-direction) of the screen and the black layers 34 are formed on the side surfaces of the second electrodes 30 while overlapping the first electrodes 28, the black layers 34 may absorb and block light directed to boundary portions between the first and second electrodes 28 and 30, thereby preventing or substantially minimizing light leakage between electrodes, e.g., in the horizontal direction. It is further noted that twisting angles of the liquid crystal molecules in the liquid crystal layer 32 may be configured to vary only in accordance with a voltage difference between the common electrode 24 and the first electrodes 28 in order to control the light transmission.

In contrast, if liquid crystal molecules are influenced by voltage of the second electrodes 30, i.e., electrodes positioned alternately with the first electrodes 28 and having a substantially same electric potential as the common electrode 24, a voltage difference equal to the liquid crystal driving voltage V1 may be generated between the first and second electrodes 28 and 30. The voltage difference between the first and second electrodes 28 and 30 may distort an electric field at regions corresponding to opposite ends of each of the first electrodes 28, thereby varying the alignment of the liquid crystal molecules in the liquid crystal layer 32. Alignment variation of liquid crystal molecules in the liquid crystal layer 32 may cause light leakage in regions exhibiting distorted electric field, e.g., interception regions may be gray rather than black.

As discussed previously, formation of the black layers 34 along lateral surfaces of the second electrodes 30, i.e., so the black layers 34 overlap longitudinal edges of the first electrodes 28 along the y-axis, may prevent or substantially minimize light leakage between electrodes, e.g., light leakage due to structure and/or electric field distortion. For example, as illustrated in a plan view of the first and second electrodes 28 and 30 of FIG. 6, the black layers 34 may be directly under the first electrode 28. The black layers 34 may absorb light in regions between adjacent first and second electrodes 28 and 30, so light leakage caused by gaps between adjacent electrodes, e.g., along the horizontal direction, or electric field distortion may be prevented or substantially minimized, e.g., display of the gray may be prevented.

Figure 8:
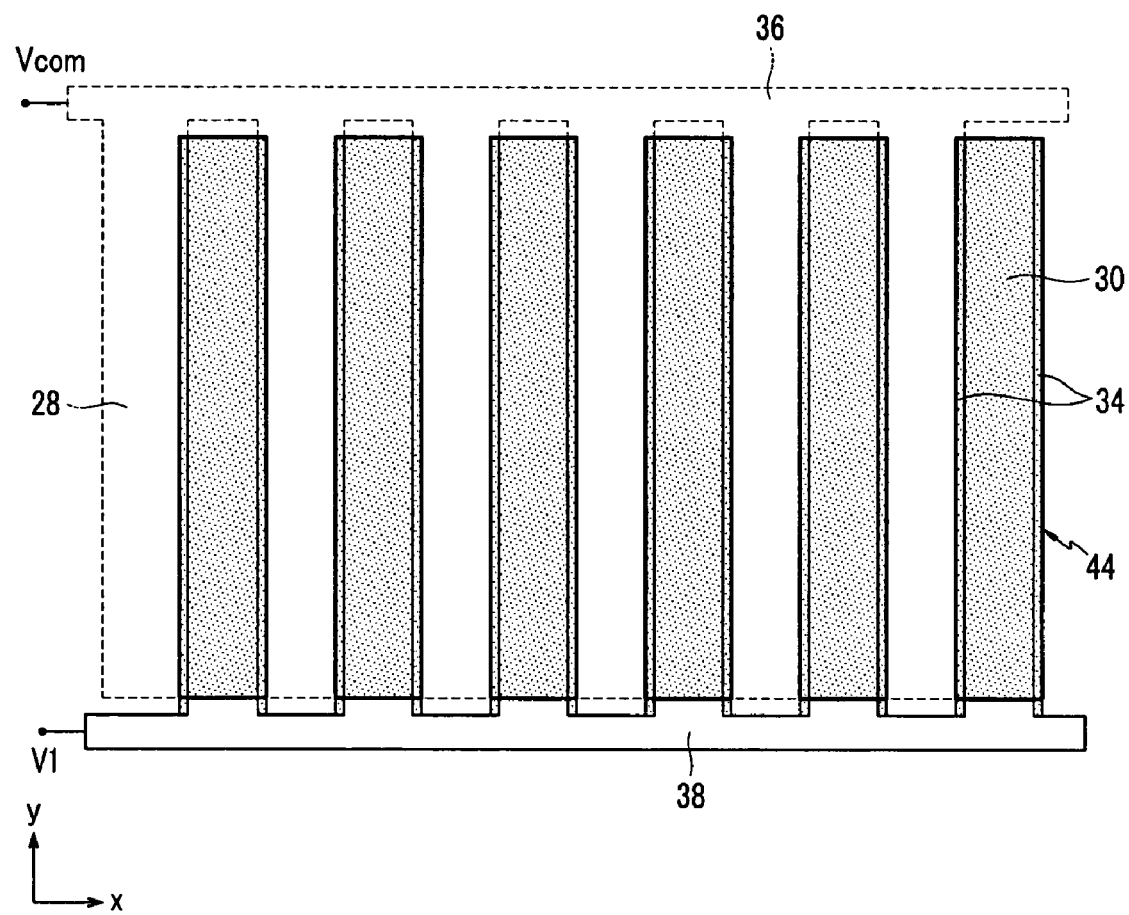
FIG. 8 illustrates a top plan view of the first and second electrodes of FIGS. 2-3 for a second time period in FIG. 5.
Figure 9:
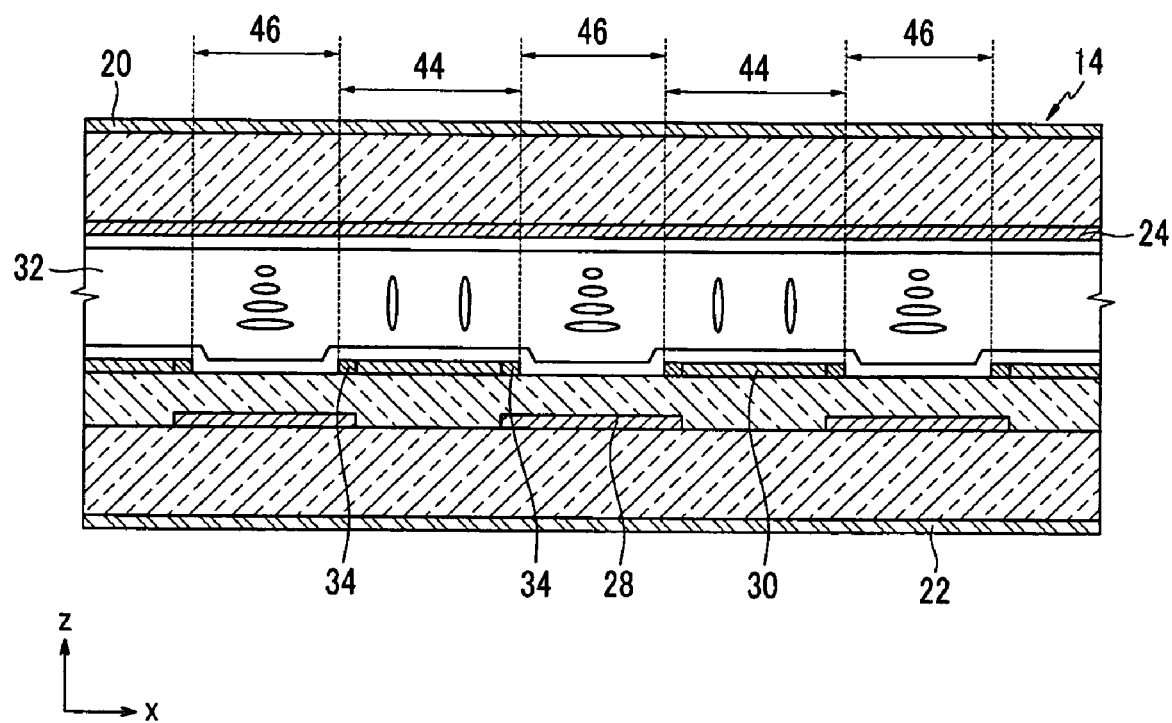
FIG. 9 illustrates a partial cross-sectional view of a barrier unit of FIG. 1 for a second time period in FIG. 5.

FIGS. 8-9 illustrate a principle for optically forming the light interception and transmission regions 44 and 46 in the barrier unit 14 for the second time period T2. Referring to FIGS. 8-9, the common voltage Vcom may be applied to the common electrode 24, and the liquid crystal driving voltage V1 may be applied to the second connector 38, i.e., to the second electrodes 30. A voltage difference between the common and second electrodes 24 and 30 may align the liquid crystal molecules in the liquid crystal layer 32 vertically along the z-axis in the barrier unit 14 at regions corresponding to the second electrodes 30. Therefore, light linearly polarized along the A2-axis by the second polarizing plate 22 (see FIG. 4) may maintain its polarization direction in regions corresponding to the second electrodes 30 when passing through the liquid crystal layer 32.

Since light polarized along the A2-axis may maintain its polarization in regions corresponding to the second electrodes 30, light in regions corresponding to the second electrodes 30 may not pass through the first polarizing plate 20. As a result, in the barrier unit 14, regions corresponding to the second electrodes 30 and the black layers 34 may optically function as the light interception regions 44, i.e., light directed to regions corresponding to the black layers 34 may be absorbed by the black layers 34 regardless of the alignment of the liquid crystal molecules, and the remaining regions may function as the light transmission regions 46, e.g., regions between adjacent and facing black layers 34 that overlap the first electrodes 28. At this point, the first electrodes 218 may be applied with the common voltage Vcom or may be floated. As discussed previously with reference to the first time period T1 in FIGS. 6-7, the structure of the first electrodes 28, second electrodes 30, and black layers 34 may prevent or substantially minimize light leakage from the barrier unit 14 in the second time period T2.

An electronic display device with a barrier unit according to an example embodiment may display stereoscopic images without light leaks from the barrier unit 14, so crosstalk may be suppressed. Therefore, a quality of the stereoscopic image and a contrast of the screen may be enhanced. The electronic display device 100 of the present exemplary embodiment may have an aperture ratio of about 50% or less by the black layers 34, as will be explained in more detail below with reference to FIG. 10. Thus, the quality of the stereoscopic image may be improved, and resolution of a displayed stereoscopic image may be enhanced by preventing light from leaking from the barrier unit 14.

Figure 10:
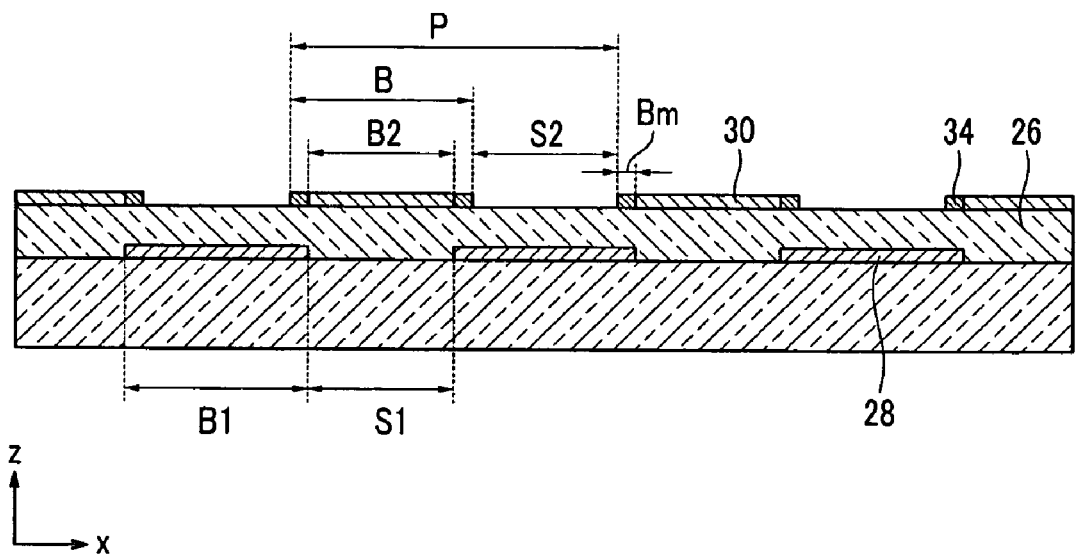
FIG. 10 illustrates a partially enlarged view of the barrier unit of FIG. 1.

FIG. 10 illustrates a partial enlarged view of the barrier unit of FIG. 1. Referring to FIG. 10, reference symbols B1 and B2, respectively, indicate a width of each of the first electrodes 28 and a width of each of the second electrodes 30, and reference symbol Bm indicates a width of each of the black layers 34. Further, reference symbols S1 and S2, respectively, indicate a gap between the first electrodes 28 and a gap between the black layers 34. The reference symbol B may be defined as a sum of a width of one second electrode 30 and two black layers 34 adjacent thereto, i.e., B2+2Bm.

It is noted that since regions defined by the gaps S1 and S2 may function as the light transmission regions 46 when the barrier unit 14 is driven, the gaps S1 and S2 may define widths of the light transmission regions 46 in the first and second time periods T1 and T2, respectively. It is further noted that since regions defined by the widths B1 and B function as the light interception regions 44 when the barrier unit 14 is driven, the widths B1 and B may define widths of the light interception regions 44 in the first and second time periods T1 and T2, respectively. A sum of the widths B and S2 may define a pitch P of the transmission region 46 in the second time period T2, and a sum of the widths B1 and S1 may define a pitch of the transmission region 46 in the first time period T1. Since the widths B1 and B of the light interception region 44 may be greater than respective widths S1 or S2 of the light transmission region 46, an aperture ratio (S1/P) or (S2/P) of the barrier unit 14 may be about 50% or less.

Figure 11:
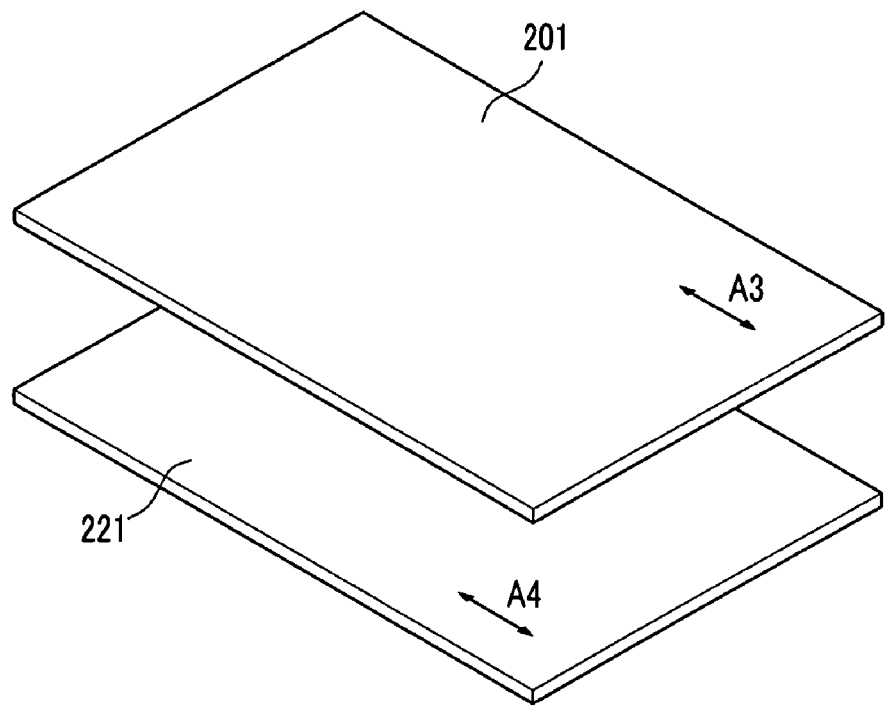
FIG. 11 illustrates a perspective view of first and second polarizing plates of a barrier unit in an electronic display device according to another example embodiment.

FIG. 11 illustrates a schematic diagram of first and second polarizing plates of an electronic display device according to another example embodiment. Referring to FIG. 11, an electronic display device may be substantially the same as the electronic display device 100 described previously with reference to FIGS. 1-10, with the exception of including first and second polarizing plates 201 and 221 instead of the first and second polarizing plates 20 and 22. In particular, the first and second polarizing plates 201 and 221 having respective polarizing axis A3 and A4 may be configured so polarizing axis A3 and A4 may be parallel to each other. Accordingly, light polarized along the A4-axis of the second polarizing plate 221 may be twisted by about 90° when passing through the liquid crystal layer 32, and thus, may not pass through the first polarizing plate 201. Therefore, a barrier unit including the first and second polarizing plates 201 and 221 may realize a full interception mode, i.e., a normally black mode, in a state where no voltage is applied. For example, predetermined voltage signals may be applied to the common electrode 24 and to the first and second electrodes 28 and 30, so that the barrier unit may realize a full interception mode to display, e.g., 2D images. The barrier unit with the normally black mode may be effective in reducing power consumption when an electronic display device displays stereoscopic images, i.e., 3D images.

Figure 12:
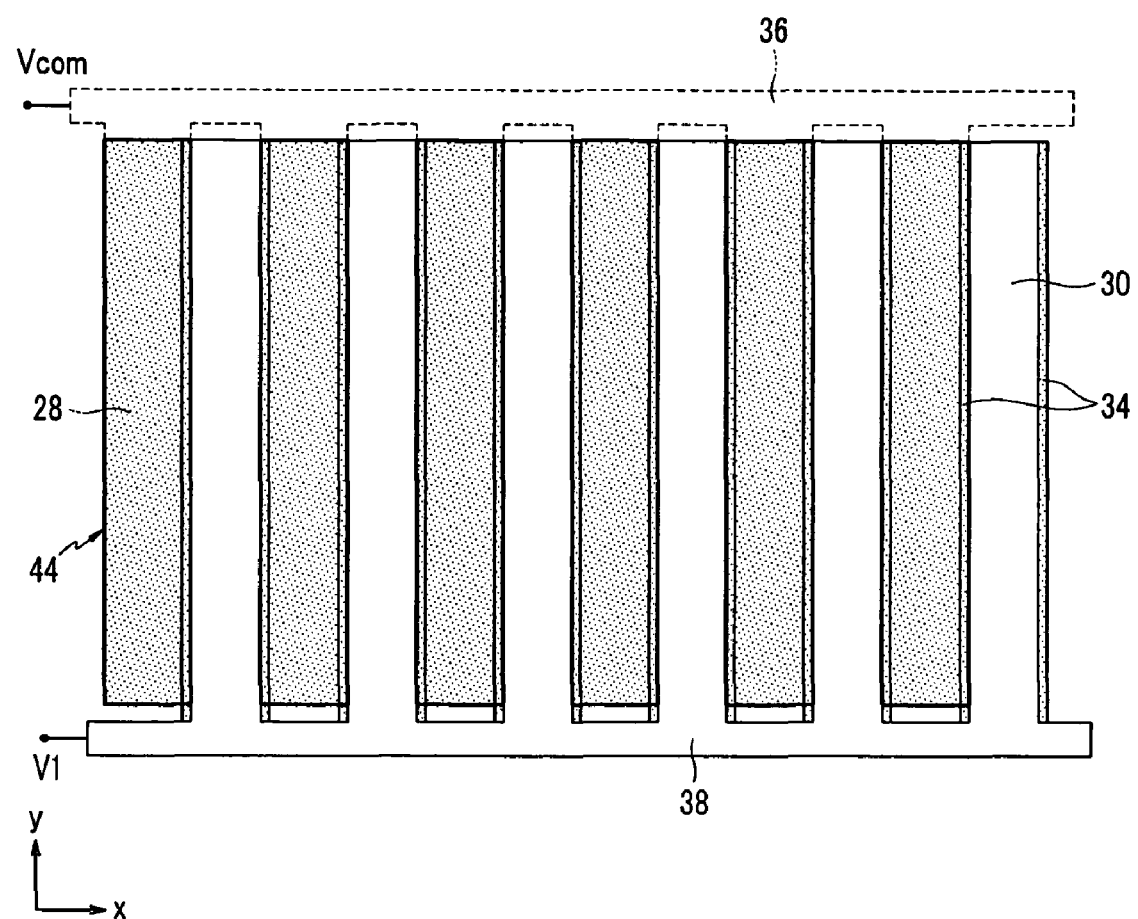
FIG. 12 illustrates a top plan view of first and second electrodes for a first time period in an electronic display device including the polarizing plates of FIG. 11.
Figure 13:
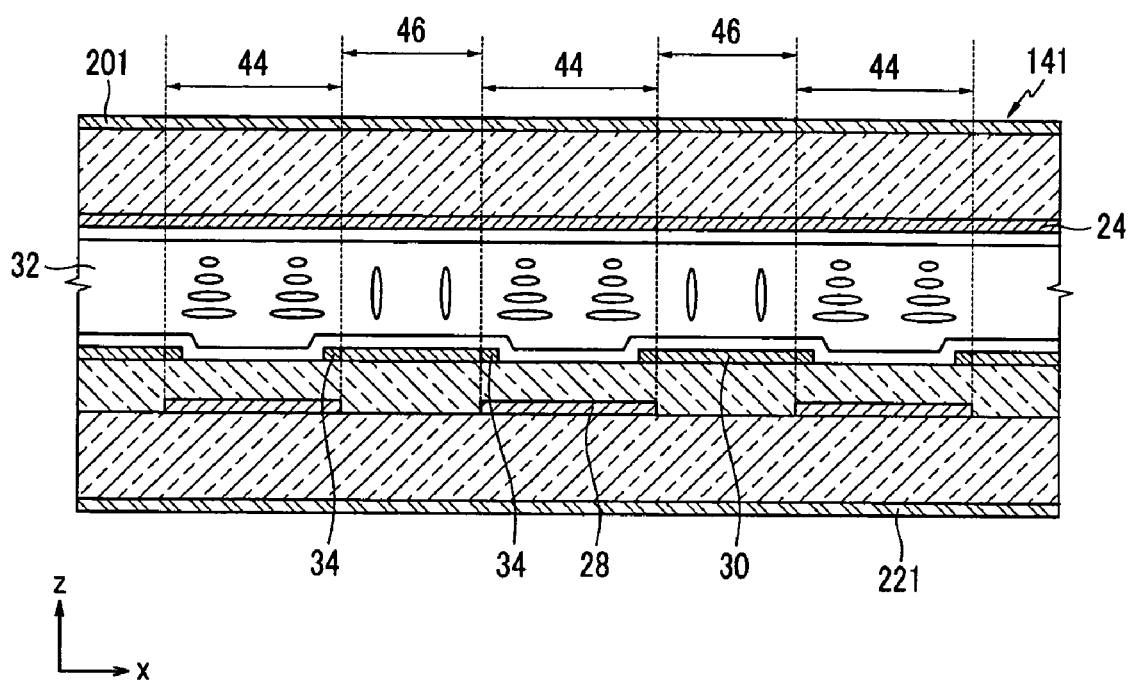
FIG. 13 illustrates a partial cross-sectional view of a barrier unit for a first time period in an electronic display device including the polarizing plates of FIG. 11.

FIGS. 12-13 illustrate a principle for optically forming the light interception and transmission regions 44 and 46 in the barrier unit for a first time period T1 (see FIG. 5). Referring to FIGS. 12-13, a common voltage Vcom may be applied to the common electrode 24 and a liquid crystal driving voltage V1 may be applied to the second connector 38, i.e., to the second electrodes 30. A voltage difference between the common and second electrodes 24 and 30 may align the liquid crystal molecules in the liquid crystal layer 32 vertically along the z-axis in a barrier unit 141 at regions corresponding to the second electrodes 30. The barrier unit 141 may be substantially the same as the barrier unit 14 described previously with reference to FIGS. 1-10, with the exception of the first and second polarizing plates 201 and 221 described previously with reference to FIG. 11.

Therefore, light linearly polarized along the A4-axis by the second polarizing plate 221 (see FIG. 11) may maintain its polarization direction in regions corresponding to the second electrodes 30 when passing through the liquid crystal layer 32, thereby passing through the first polarizing plate 201. As a result, in the barrier unit 141, regions corresponding to the second electrodes 30 may optically function as the light transmission regions 46 and the remaining regions may function as the light interception regions 44. In other words, only light in regions corresponding to the second electrodes 30 may pass through the first polarizing plate 20 to define the light transmission regions 46. Polarization of light in regions corresponding to the first electrodes 28 may be rotated by about 90° when passing through the liquid crystal layer 32, thereby failing to pass through the first polarizing plate 201, i.e., defining interception regions 44. At this point, the first electrodes 28 may be applied with the common voltage Vcom or may be floated.

Figure 14:
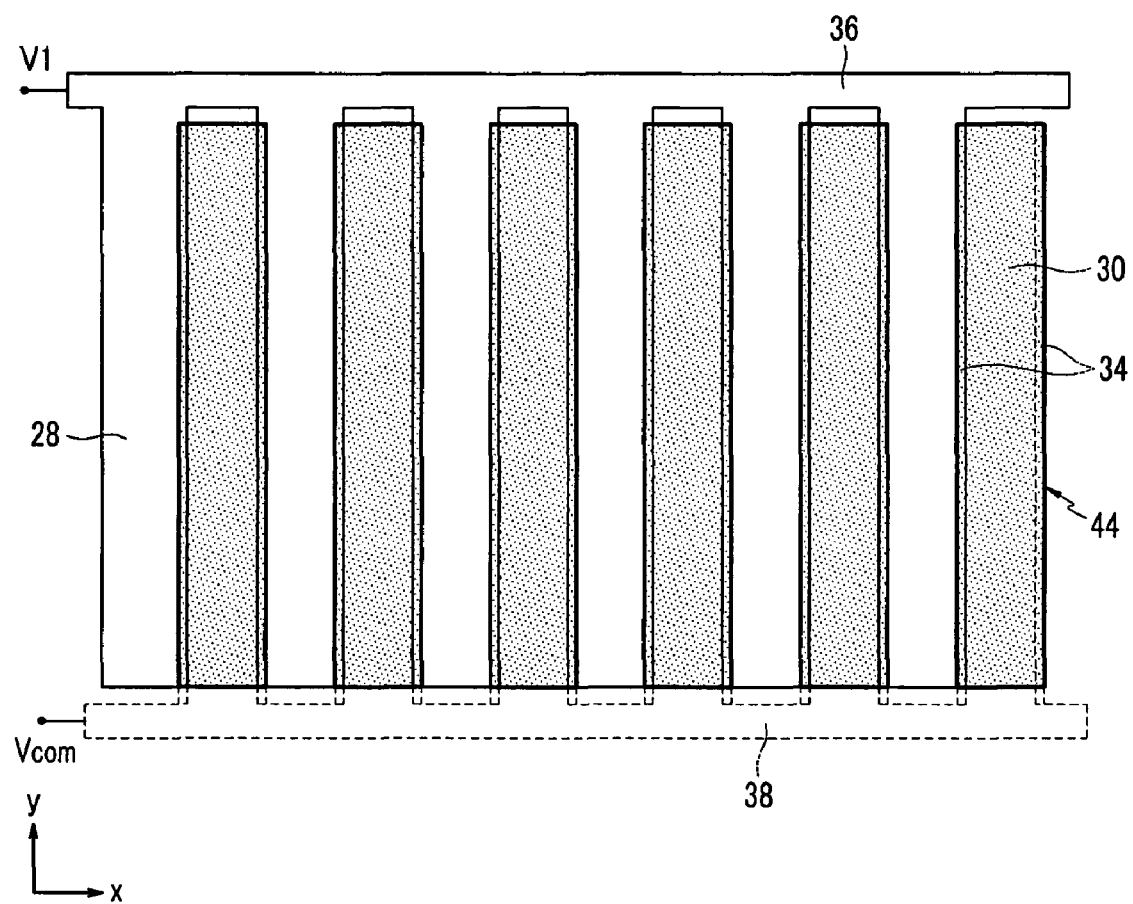
FIG. 14 illustrates a top plan view of first and second electrodes for a second time period in an electronic display device including the polarizing plates of FIG. 11.
Figure 15:
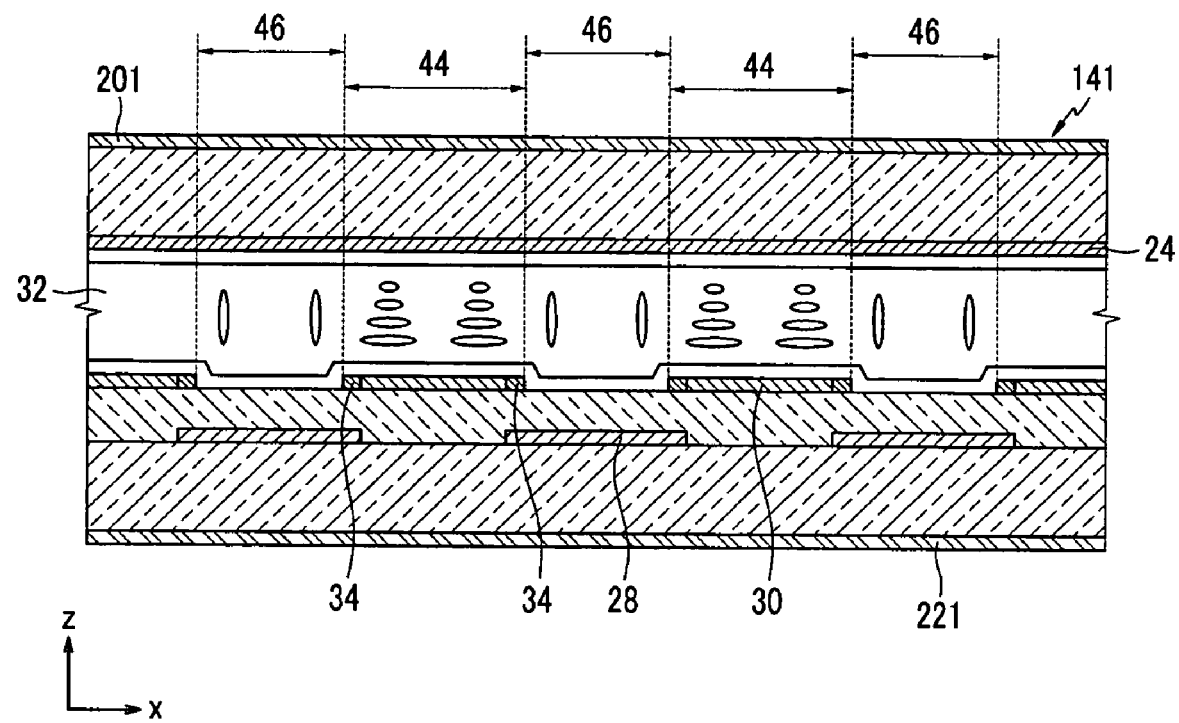
FIG. 15 illustrates a partial cross-sectional view of a barrier unit for a second time period in an electronic display device including the polarizing plates of FIG. 11.

FIGS. 14-15 illustrate a principle for optically forming the light interception and transmission regions in the barrier unit 141 for the second time period T2 (see FIG. 5). Referring to FIGS. 14-15, the common voltage Vcom may be applied to the common electrode 24, and the liquid crystal driving voltage V1 may be applied to the first connector 36, i.e., the first electrodes 28. A voltage difference between the common and first electrodes 24 and 28 may align the liquid crystal molecules in the liquid crystal layer 32 vertically along the z-axis in the barrier unit 141 at regions corresponding to the first electrodes 28. Therefore, light linearly polarized along the A4-axis (see FIG. 11) by the second polarizing plate 221 may maintain its polarization direction in regions corresponding to the first electrodes 28 when passing through the liquid crystal layer 32, thereby passing through the first polarizing plate 201. It is noted that light directed to regions corresponding to the black layers 34 may be absorbed by the black layers 34 regardless of the alignment of the liquid crystal molecules, as discussed previously with reference to FIGS. 8-9. As a result, in the barrier unit 141, regions corresponding to the first electrodes 28 and not overlapping the black layers 34 may optically function as the light transmission regions 46, and the remaining regions may function as the light interception regions 44. At this point, the second electrodes 30 may be applied with the common voltage Vcom or may be floated.

An electronic display device with the barrier unit 141 may include first and second electrodes 28 and 30 and black layers 34 configured to display stereoscopic images without light leaks from the barrier unit 141, so crosstalk may be suppressed. Therefore, a quality of the stereoscopic image and a contrast of the screen may be enhanced, as described previously with reference to the electronic display device 100 of FIGS. 1-10.

Example embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:
1. An electronic display device, comprising:
    a display unit adapted to display an image; and
    a barrier unit overlapping the display unit, the barrier unit including:
        a liquid crystal layer between first and second substrates, the first and second substrates facing each other;
        a common electrode between the liquid crystal layer and the first substrate;
        a transparent insulation layer between the liquid crystal layer and the second substrate, the transparent insulation layer having an inner surface facing the liquid crystal layer and an outer surface facing the second substrate;
        a plurality of first electrodes along a first direction between the outer surface of the transparent insulation layer and the second substrate, the first electrodes being spaced apart from each other along a second direction;

a plurality of second electrodes along the first direction between the inner surface of the transparent insulation layer and the first substrate; and a plurality of black layers along the first direction on lateral surfaces of the second electrodes, lateral surfaces of the second electrodes being perpendicular to a contact plane between the transparent insulation layer and the second electrodes, and the black layers overlapping portions of the first electrodes, wherein two black layers of the plurality of black layers are positioned along two respective lateral surfaces of each second electrode.

2. The electronic display device as claimed in claim 1, wherein black layers on facing lateral surfaces of adjacent second electrodes are spaced apart from each other to define a gap therebetween.

3. The electronic display device as claimed in claim 1, wherein a first electrode overlaps two black layers of two corresponding adjacent second electrodes, the two black layers facing each other and being spaced apart from each other.

4. The electronic display device as claimed in claim 1, wherein the first and second electrodes are arranged in an alternating pattern.

5. The electronic display device as claimed in claim 4, wherein a lateral surface of a first electrode is in a substantially same plane as a lateral surface of an immediately adjacent second electrode.

6. The electronic display device as claimed in claim 1, wherein a width of the first electrodes is greater than a width of the second electrodes, the width of the first and second electrodes being measured along the second direction.

7. The electronic display device as claimed in claim 6, wherein a width of a single first electrode substantially equals a sum of a width of a single second electrode and widths of two black layers, the widths of the first and second electrodes and the black layers being measured along the second direction.

8. The electronic display device as claimed in claim 6, wherein a width of a single first electrode is greater than a gap between two adjacent black layers facing each other, the two black layers corresponding to respective two adjacent second electrodes.

9. The electronic display device as claimed in claim 1, wherein the barrier unit further comprises a first polarizing plate on an outer surface of the first substrate and a second polarizing plate on an outer surface of the second substrate, outer surfaces of the first and second substrates facing away from the liquid crystal layer, a polarizing axis of the first polarizing plate being substantially perpendicular to a polarizing axis of the second polarizing plate.

10. The electronic display device as claimed in claim 9, wherein the electronic display device is adapted to apply no voltage to the common electrode and the first and second electrodes of the barrier unit to display a 2-dimensional (2D) image.

11. The electronic display device as claimed in claim 9, wherein the electronic display device is adapted to apply predetermined voltage signals to the common electrode and the first and second electrodes of the barrier unit to display a 3-dimensional (3D) image.

12. The electronic display device as claimed in claim 11, wherein the predetermined voltage signals include:

a common voltage signal adapted to be applied to the common electrode during a first time period of a frame and during a second time period of the frame; and a liquid crystal driving voltage signal adapted to be applied to the first electrodes during the first time period and to the second electrodes during the second time period, the first and second time periods defining the frame.

13. The electronic display device as claimed in claim 1, wherein the barrier unit further comprises a first polarizing plate on an outer surface of the first substrate and a second polarizing plate on an outer surface of the second substrate, outer surfaces of the first and second substrates facing away from the liquid crystal layer, a polarizing axis of the first polarizing plate being substantially parallel to a polarizing axis of the second polarizing plate.

14. The electronic display device as claimed in claim 13, wherein the electronic display device is adapted to apply a common voltage to the common electrode and a liquid crystal driving voltage to the first and second electrodes of the barrier unit to display a 2-dimensional (2D) image.

15. The electronic display device as claimed in claim 13, wherein the electronic display device is adapted to apply predetermined voltage signals to the common electrode and the first and second electrodes of the barrier unit to display a 3-dimensional (3D) image.

16. A barrier unit for an electronic display device, comprising:

a liquid crystal layer between first and second substrates, the first and second substrates facing each other;

a common electrode between the liquid crystal layer and the first substrate;

a transparent insulation layer between the liquid crystal layer and the second substrate, the transparent insulation layer having an inner surface facing the liquid crystal layer and an outer surface facing the second substrate;

a plurality of first electrodes along a first direction between the outer surface of the transparent insulation layer and the second substrate, the first electrodes being spaced apart from each other along a second direction;

a plurality of second electrodes along the first direction between the inner surface of the transparent insulation layer and the first substrate, and a plurality of black layers along the first direction on lateral surfaces of the second electrodes, lateral surfaces of the second electrodes being perpendicular to a contact plane between the transparent insulation layer and the second electrodes, and the black layers overlapping portions of the first electrodes, wherein two black layers of the plurality of black layers are positioned along two respective lateral surfaces of each second electrode.

* * * * *